Oct. 2, 1928.
J. H. WAGENHORST
1,686,301
DEMOUNTABLE RIM AND MEANS FOR FASTENING SAME
Filed May 28, 1921   2 Sheets-Sheet 1
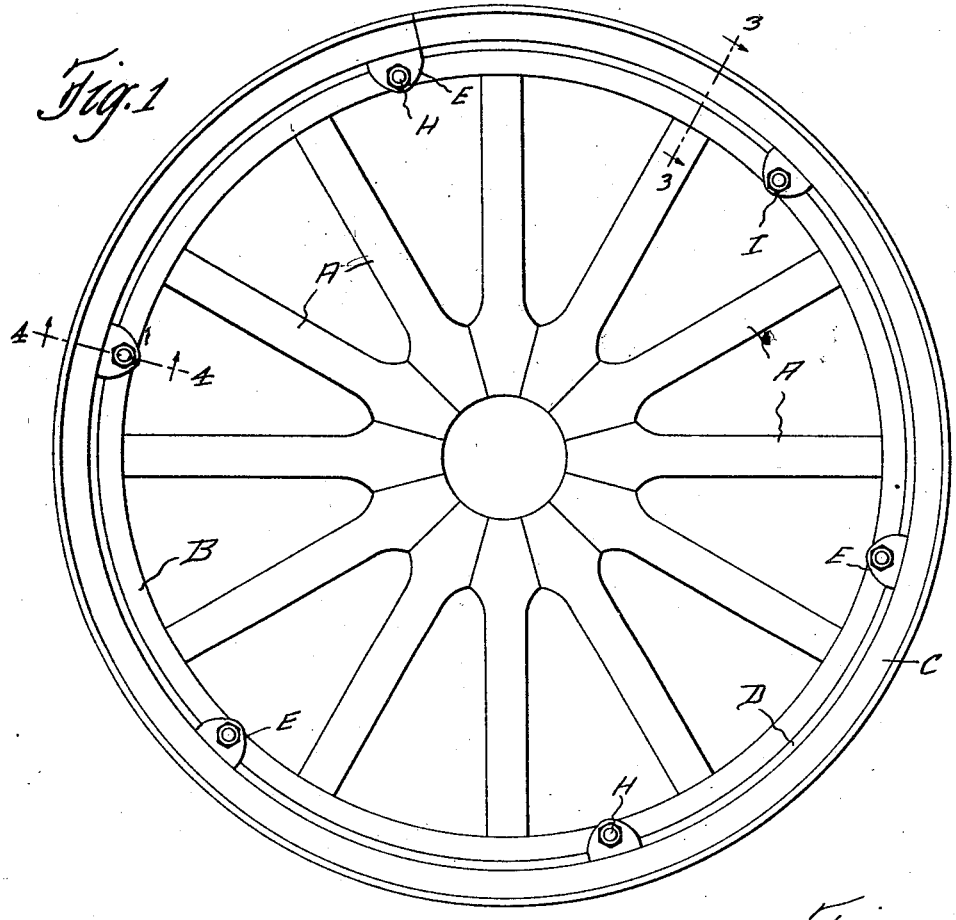
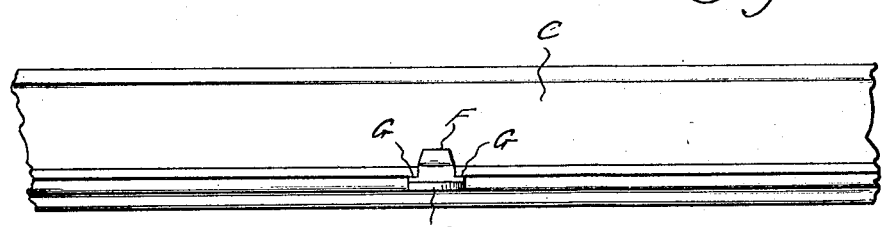
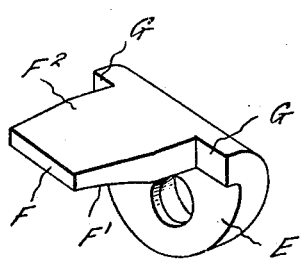
Inventor
James H. Wagenhorst
By Hull, Brock & West
Attys.

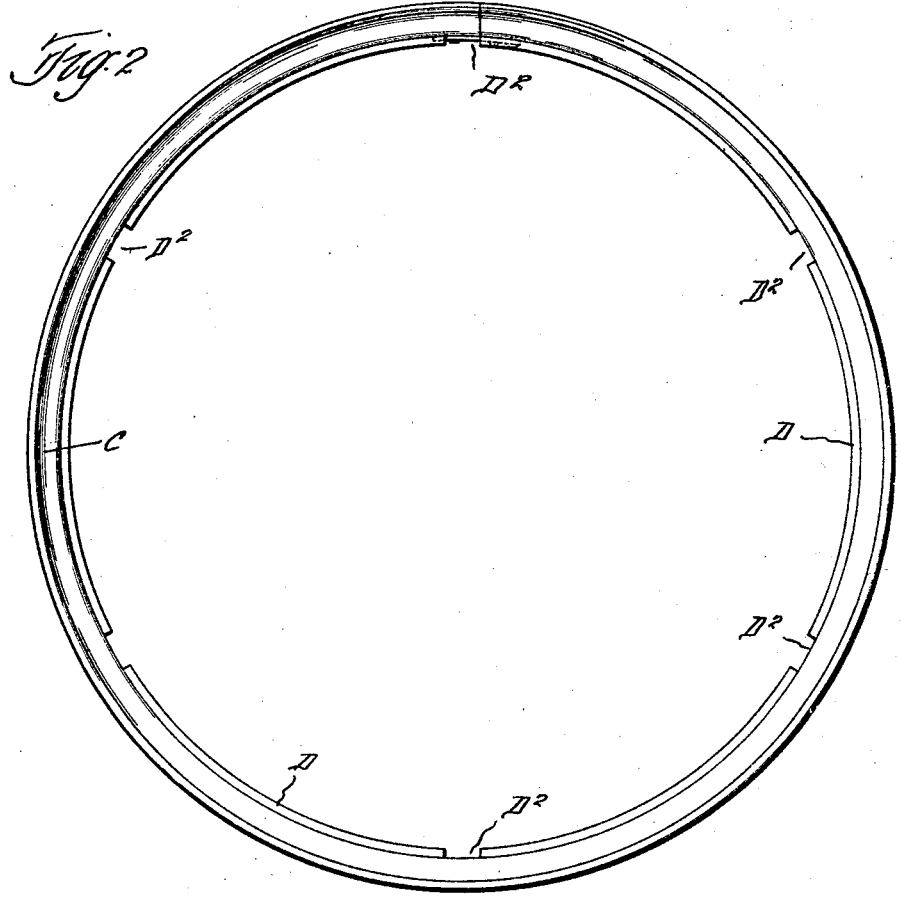
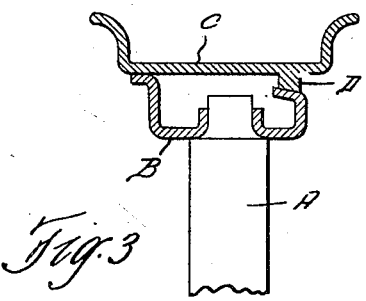
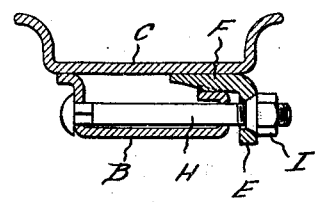

Patented Oct. 2, 1928.

1,686,301

UNITED STATES PATENT OFFICE.

JAMES H. WAGENHORST, OF JACKSON, MICHIGAN.

DEMOUNTABLE RIM AND MEANS FOR FASTENING SAME.

Application filed May 28, 1921. Serial No. 473,539.

This invention relates generally to automobile wheels and more particularly to the demountable tire carrying rim and the means for fastening said demountable rim upon the wheel body and providing a driving connection between said rim and wheel body. The object of the invention is to simplify the rim fastening means and at the same time provide a driving connection between the rim and wheel body thereby eliminating certain parts heretofore employed and thereby eliminating a definite amount of weight and at the same time reducing the cost of manufacture. A still further object is to provide a combined fastening and driving means which shall be exceedingly simple, easy to operate, and one which will tend toward greater accuracy in positioning the rim upon the wheel body, both as to concentricity and also the arrangement of a rim in a true wheel plane. With these various objects in view, the invention consists in the novel features of construction and in the manner of combining and arranging them, all of which will be fully described hereinafter and set forth in the appended claims. In the drawings forming a part of this specification Fig. 1 is a side elevation of a wheel having a demountable tire carrying rim constructed and fastened in accordance with my invention; Fig. 2 is a side elevation of the tire carrying rim removed from the wheel; Fig. 3 is a detail sectional view on the line 3—3 of Fig. 1; Fig. 4 is a detail sectional view on the line 4—4 of Fig. 1; Fig. 5 is a fragmentary plan view; and Fig. 6 is a detail perspective view of the clamp.

In carrying out my invention I employ a wheel body preferably composed of a plurality of wooden spokes A and a sheet metal felly or fixed rim B, said felly or fixed rim being preferably of the channel type as shown, although it will be understood that the invention can be used upon the ordinary felly band applied to a wooden felly. When the fixed rim or felly is of sheet metal and of the channel type, I prefer to make the front leg thereof slightly shorter than the rear leg in order to facilitate the mounting and demounting of the rim thereon. The demountable tire carrying rim C may be either straight side or clincher and the base thereof is formed with an inwardly projecting bead or rib D adjacent the front side and this inwardly projecting bead or rib can be solid as shown and constituting a part of a hot rolled section or it can be in the form of an inrolled bead rolled inwardly from the base proper. This inwardly projecting rib or bead is adapted to contact with the front leg of the felly or fixed rim when the demountable rim is securely fastened upon the fixed rim or felly while the rear side of the base of the demountable rim contacts with the rear leg of the fixed rim or felly.

For the purpose of fastening the demountable tire carrying rim upon the fixed rim or felly and at the same time providing a driving connection between the demountable rim and wheel body, I employ a number of clamps each comprising an apertured portion E and a portion F substantially at right angles to the apertured portion E and which is adapted to fit between the fixed and demountable rims in the following manner: The inwardly projecting rib or bead D is recessed or cut away at definite intervals as indicated at $D^2$ and the rearwardly projecting portion F of the clamp is adapted to fit into said notch or recess and the shouldered portions G upon opposite sides of the rearwardly projecting portion F contact with the front faces of the adjacent portions of said rib or bead. When the clamp is thus inserted between the fixed and demountable rims the aperture in the member E will receive the front end of the transverse bolt H therethrough and a nut I screwed upon the end of said bolt will force the clamp rearwardly and the shoulders G contacting with the rib or bead will force the tire carrying rim to the true plane. The member F is slightly tapered as shown at F' to facilitate the introduction of the clamp between the felly and rim, and the outer portion $F^2$ thereof is made flat so that the device acts as a clamp, the clamp as a whole being drawn up tight by means of a nut and being forced into contact with both the fixed and demountable rims it engages the notched or recessed portion of the demountable rim and provides a driving connection between the bolt and demountable rim and at the same time the shoulders G contacting with the rib or bead force the demountable rim rearwardly and hold the same in place upon the wheel body when the nut has been properly tightened. It will be noted that the rear end of the nut is tapered to fit the counterbored opening in the member E thereby providing a locking connection between the nut and clamp.

It will be noted that the portion E of the clamp which extends radially inward is spaced from the fixed rim. The result is that the clamp does not fulcrum upon the fixed rim and the full pull of the bolt exerted by the nut I on the clamp is transmitted to the demountable rim to force it to its seat on the fixed rim. The present application constitutes a continuation in part of my co-pending application Serial No. 449,027, rim and means for fastening the same, filed March 2nd, 1921. It will thus be seen that I provide a simple and efficient rim fastening means which also provides a driving connection between the demountable rim and wheel body.

Having thus described my invention, what I claim is:

1. The combination with a channeled fixed rim, of a demountable tire carrying rim having an inwardly projecting bead adapted to contact with the front leg of the fixed rim, said bead being notched or recessed at definite points, and clamps carried by the fixed rim and having each a rearwardly projecting portion adapted to fit between the fixed and demountable rims when occupying the notched or recessed portion of the inwardly projecting bead, and laterally projecting shoulders adapted to engage the adjacent portions of the inwardly projecting bead, said clamps having radial inwardly extending portions spaced from the fixed rim and removed from bearing contact therewith at all points.

2. The combination with a fixed rim of a demountable tire carrying rim arranged thereon, said demountable rim having an inwardly projecting bead, said bead being notched or recessed at definite points, clamps carried by the fixed rim and having each a rearwardly projecting portion adapted to fit between the fixed and demountable rims and occupy one of the notched or recessed portions of the inwardly projecting bead, said clamps having oppositely disposed laterally projecting shoulders adapted to engage the adjacent portions of the inwardly projecting bead and radial inwardly extending portions spaced from the fixed rim and removed from bearing contact therewith at all points.

3. The combination with a fixed rim carrying bolts, of a demountable tire carrying rim arranged upon the fixed rim and having an inwardly projecting bead, said bead being recessed or notched at definite intervals, and clamps each having one member apertured and adapted to fit upon one of the bolts carried by the fixed rim, said member being removed from bearing contact with the fixed rim at all points, and another member adapted to fit between the fixed and demountable rims and occupy a notch or recess in the inwardly projecting bead, each of said clamps having laterally projecting shoulders upon opposite sides of said last named member, adapted to engage the inwardly projecting rib or bead, and nuts for securing the clamps, each of said nuts engaging the apertured member of one of said clamps, whereby the full pull of the nut is transmitted by the clamp to the demountable rim.

4. A wheel structure comprising a metallic fixed rim having spaced parallel flanges of unequal height, the outer edges of said flanges terminating in tapered surfaces, a demountable tire carrying rim, one side of said rim resting on the higher of said flanges, a rib on the other side of said rim, said rib having a tapered under surface resting on the lower of said flanges, and means to draw said demountable rim in wedging contact with said flange about its circumference, said means comprising a clamping plate, one edge of said clamping plate bearing against the outer surface of the rib and a projection from the edge of the clamping plate adapted to engage a recess in the rib.

5. The combination with a fixed rim, of bolts passing therethrough, a demountable tire carrying rim having an inwardly projecting portion, said inwardly projecting portion being recessed opposite the bolts, clamps arranged upon said bolts and nuts for engaging said clamps, said clamp having a portion adapted to fit into the recessed portion of the fixed rim and also a portion adapted to bear laterally upon said inwardly projecting portion.

6. The combination of a channeled sheet metal felly having differential legs, the inner leg terminating in a rim receiving flange, a demountable tire carrying rim adapted to engage said flange, said demountable rim having an inwardly extending portion, bolts passing through said felly, the inwardly projecting portion of the demountable rim being recessed opposite said bolts and clamps arranged upon said bolts, each clamp having a portion adapted to fit into the recess, and a portion adapted to engage the inwardly projecting portion of the demountable rim.

7. The combination of a fixed rim having bolts extending therethrough, of a demountable tire carrying rim arranged upon the fixed rim and having an inwardly projecting portion, said inwardly projecting portion being recessed upon the bolts, clamps arranged upon said bolts, each clamp having an axially extending portion adapted to enter the recess of the inwardly projecting portion of the demountable rim and oppositely disposed lateral portions adapted to engage the outer face of said inwardly projecting portion and nuts upon the bolts for securing said clamps.

In testimony whereof, I hereunto affix my signature.

JAMES H. WAGENHORST.